US012430524B1

(12) United States Patent
Bhuiyan et al.

(10) Patent No.: US 12,430,524 B1
(45) Date of Patent: Sep. 30, 2025

(54) METHOD OF COMPENSATING ILLUMINANCE VARIATION DUE TO SKEW AND PITCHED FIELD OF VIEW FROM A HANDHELD SCANNER

(71) Applicant: ZEBRA TECHNOLOGIES CORPORATION, Lincolnshire, IL (US)

(72) Inventors: Mahmudul H. Bhuiyan, Centereach, NY (US); Mathew G. Locoteta, Shoreham, NY (US); Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/821,868

(22) Filed: Aug. 30, 2024

(51) Int. Cl.
*G06K 7/10* (2006.01)
*G06K 7/14* (2006.01)

(52) U.S. Cl.
CPC ..... *G06K 7/10564* (2013.01); *G06K 7/10881* (2013.01); *G06K 7/1413* (2013.01)

(58) Field of Classification Search
CPC ........... G06K 7/10564; G06K 7/10881; G06K 7/1413; G06K 2007/10524
USPC ..... 235/462.45, 472.01, 462.43, 454, 462.01
See application file for complete search history.

(56) References Cited

U.S. PATENT DOCUMENTS

2023/0351930 A1\* 11/2023 Grabarnik ............... G02F 1/011

\* cited by examiner

*Primary Examiner* — Edwyn Labaze
(74) *Attorney, Agent, or Firm* — Yuri Astvatsaturov

(57) ABSTRACT

Imaging devices, systems, and methods for capturing and processing images for vision applications in a non-fixed environment are described herein. An example system includes: an imaging assembly, an aiming assembly, and one or more imaging processors configured to: (a) receive a first image; (b) analyze at least a portion of the first image to determine a first focus value; (c) configure a focus parameter of the imaging assembly based on the first focus value; (d) receive a subsequent image; (e) determine a blurriness value for at least a portion of the subsequent image; (f) responsive to the blurriness value being less than a predetermined threshold value, transmit the subsequent image to a decode module; and (g) responsive to the blurriness value exceeding the predetermined threshold value: determine a subsequent focus value; (ii) configure the focus parameter based on the subsequent focus value; and (iii) repeat (d) through (g).

20 Claims, 6 Drawing Sheets

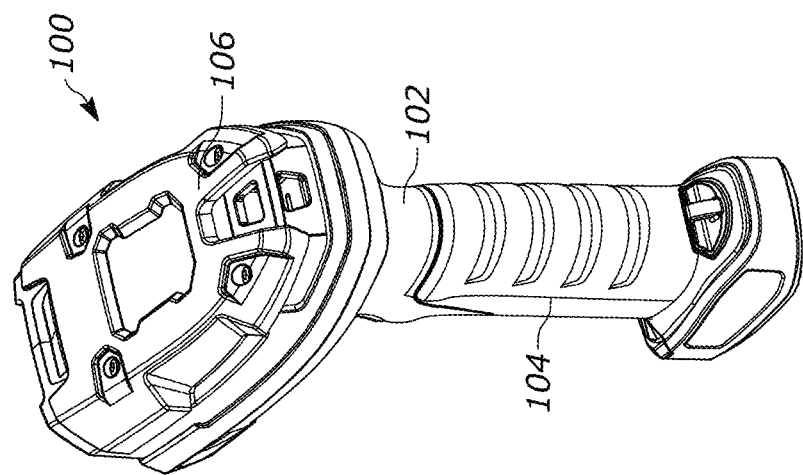
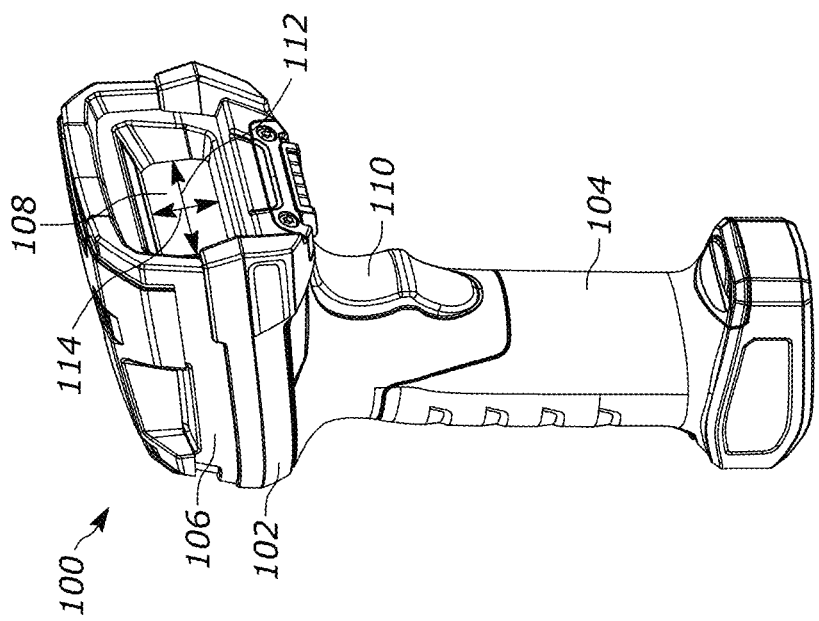
FIG. 1

METHOD OF COMPENSATING ILLUMINANCE VARIATION DUE TO SKEW AND PITCHED FIELD OF VIEW FROM A HANDHELD SCANNER

BACKGROUND

Barcode reading systems have long been used to capture and decode barcode data, which is then used to look up information regarding item in question. In handheld scanning, there is no guarantee in what orientation the user will hold the scanner relative to the item being scanned. When held with a small skew and pitch, e.g., with the item near perpendicular to a scanner window, there are no issues with scanning/optical character recognition (OCR) performance. However, if the user holds the scanner with significant skew or pitch relative to the item, issues arise. One such issue relates to uneven illumination from the scanner, when the scanner is at an angle relative to a surface of the item. That is, various handheld scanners have an illumination assembly formed of a series of light emitting diodes (LEDs) that illuminate a field of view (FOV) in which the item is ideally placed. Presently these LEDs are all driven at the same current to ensure uniform illumination over that FOV. However, when a surface of an item is angled relative to the handheld scanner, the illumination from these LEDs becomes non-uniform. Some parts of the surface are brighter than other parts and that can degrade scanning and reading of barcodes on that surface. Further, not only is the scanning performance degraded in such circumstances, by driving all the LEDs at the same current, the scanner uses a higher power consumption than is needed.

There is a need for detecting if a user is holding the scanner with a large skew/pitch relative to an item, resulting in uneven illumination, and for compensating for the resultant non-uniformly illuminated field of view. Such solutions would improve decoding/OCR performance and decrease unnecessary power consumption.

SUMMARY

In an embodiment, an imaging-based data capture device which provides uniform illumination of an object is provided. The imaging-based data capture device includes an imaging assembly, an illumination assembly, a processor, and a memory. The imaging assembly is operable to capture image data over a field of view. The illumination assembly has a first illumination source and a second illumination source and is operable to provide illumination light over at least a portion of the field of view. The processor is communicatively coupled to the imaging assembly, the illumination assembly, and the memory. The memory stores machine readable instruction that, when executed by the processor cause: the imaging assembly to capture a first frame with the illumination assembly providing illumination at a first level of intensity; the imaging assembly to capture a second frame with one of (i) the illumination assembly providing illumination at a second level of intensity that is lower than the first level of intensity or (ii) the illumination assembly in a deactivated state; determining, by the processor, a brightness difference between a plurality of respective regions of the first frame and the second frame; and capturing, by the image assembly, a third frame with the illumination assembly providing illumination at a third level of intensity that is different from the first level of intensity and the second level of intensity. In the machine readable instruction stored on the memory, providing illumination, by the illumination assembly, at the third level of intensity includes driving a first illumination source of the illumination assembly with a first current and driving a second illumination source of the illumination assembly with a second current that is different from the first current, with at least one of the first current or the second current being based on the brightness difference between the plurality of respective regions of the first frame and the second frame.

In some embodiments, the imaging assembly is situated between the first illumination source and the second illumination source. The first frame and the second frame are of lower resolution than that of the third frame, in some embodiments. In some embodiments, the first frame and the second frame each includes selected rows of an image of the field of view. The brightness difference between a plurality of respective regions of the first frame and the second frame is based on one or more of: (i) a range of brightness intensities, (ii) a peak intensity, and (iii) an average intensity, in some embodiments of the device.

In some embodiments of the imaging-based data capture device, the regions have differing sizes. Alternatively, or additionally, in some embodiments, one or more of the respective regions has a weighting factor. In some embodiments, the memory also includes instructions that, when executed by processor, cause the device to determine a degree of similarity between a predetermined number of the regions; and compare the degree of similarity to a threshold degree of similarity to determine whether the second frame includes an illumination of the first frame that is above the predetermined threshold. The memory of the imaging-based data capture device also includes instructions that when executed by processor cause: determining a peak intensity value for a predetermined number of regions; determining a number of regions that deviate from a mode of a set of peak intensity values from the predetermined number of regions; comparing the number of regions that deviate from the mode of the set of peak intensity values to a maximum allowable number of regions; and designating the third frame to be tolerably uniform in illumination over the at least a portion of the field of view when the number of regions that deviate from the mode of the set of peak intensity values is less than or equal to the maximum allowable number of regions, in some embodiments.

In an embodiment, a method for capturing image-based data using a handheld device is provided. The method includes capturing, by an imaging assembly, a first frame with an illumination assembly providing illumination at a first level of intensity; capturing, by the imaging assembly, a second frame with one of (i) the illumination assembly providing illumination at a second level of intensity that is lower than the first level of intensity or (ii) the illumination assembly in a deactivated state; determining a brightness difference between a plurality of respective regions of the first frame and the second frame; and capturing, by the image assembly, a third frame with the illumination assembly providing illumination at a third level of intensity that is different from the first level of intensity and the second level of intensity. In such a method, providing illumination at the third level of intensity includes driving a first illumination source of the illumination assembly with a first current and driving a second illumination source of the illumination assembly with a second current that is different from the first current, and at least one of the first current or the second current is based on the brightness difference between the plurality of respective regions of the first frame and the second frame.

In some embodiments, the method includes the handheld device includes the imaging assembly that is operable to capture image data over a field of view; and the illumination assembly that has at least two illumination sources, in which the illumination assembly operable to provide illumination light over at least a portion of the field of view. In some such embodiments, the imaging assembly is situated between the first illumination source and the second illumination source. In some embodiments, the first frame and the second frame are of lower resolution than that of the third frame. Alternatively, or additionally, the first frame and the second frame each comprises selected rows of an image of a field of view in some embodiments. In some embodiments of the method, the brightness difference between a plurality of respective regions of the first frame and the second frame is based on one or more of: (i) a range of brightness intensities, (ii) a peak intensity, and (iii) an average intensity. The method also includes determining a peak intensity value for a predetermined number of regions; determining a number of regions that deviate from a mode of a set of peak intensity values from the predetermined number of regions; comparing the number of regions that deviate from the mode of the set of peak intensity values to a maximum allowable number of regions; and designating the third frame to be tolerably uniform in illumination over the at least a portion of a field of view when the number of regions that deviate from the mode of the set of peak intensity values is less than or equal to the maximum allowable number of regions, in some implementations.

Some embodiments of the method include: determining a degree of similarity between a predetermined number of the regions; and comparing the degree of similarity to a threshold degree of similarity to determine whether the second frame includes and illumination of the first frame that is above the predetermined threshold. In some embodiments of the method, the regions have differing sizes. In some such embodiments, the differing sizes are preassigned to the regions based on known characteristics of the imaging assembly and characteristics of the illumination assembly. One or more of the regions has a weighting factor in some embodiments of the method.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 1 illustrates a perspective front and back view of an example scanner, in accordance with various embodiments;

Figure 2:
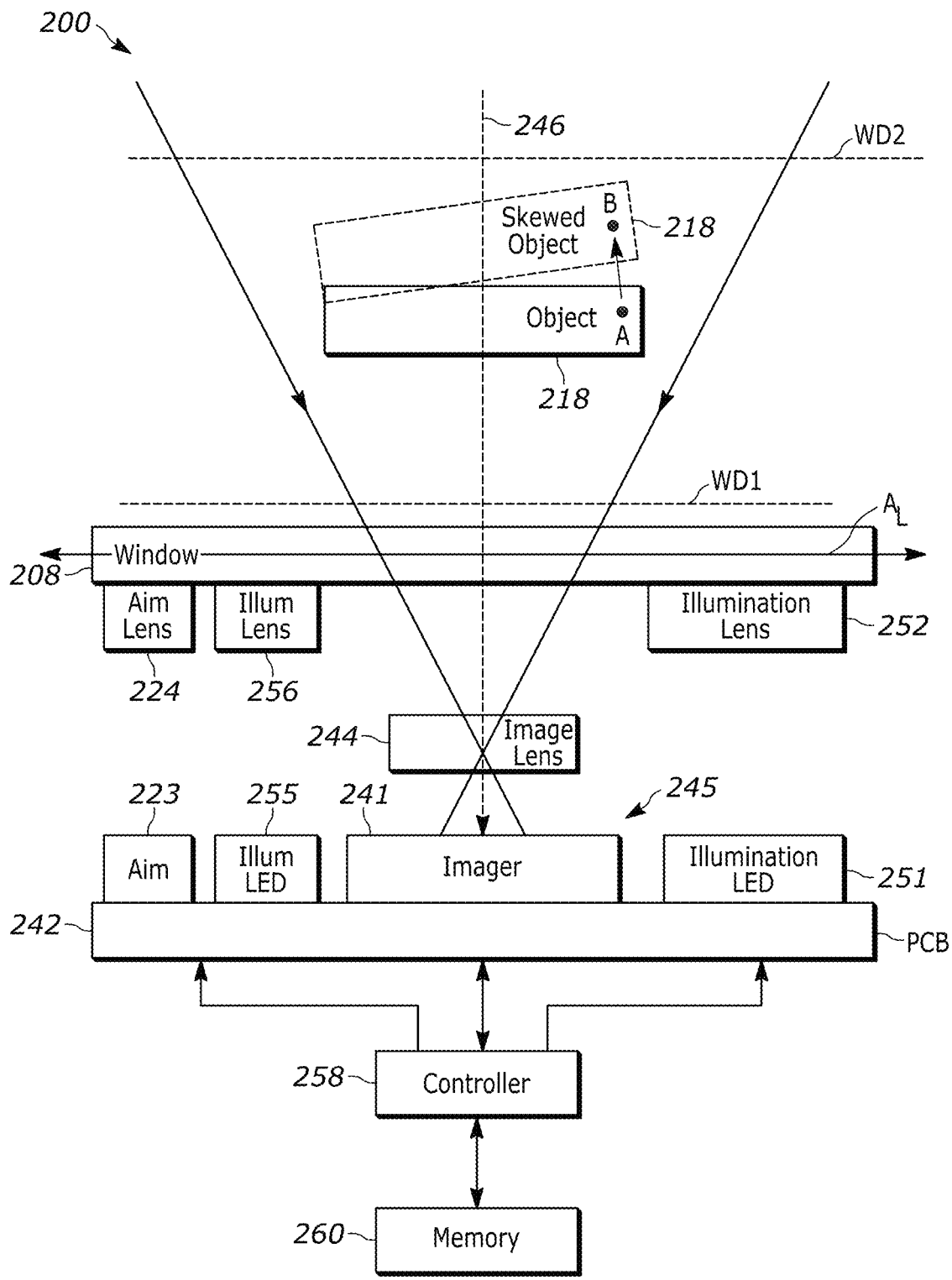
FIG. 2 illustrates a block diagram of an example imaging device such as the example scanner of FIG. 1, in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure describes imaging-based data capture devices and methods that uniformly illuminate a field of view (FOV) through detecting uneven illumination and compensating to capture an image of the FOV that is uniformly illuminated.

It is well known that the angle at which an object and imaging-based scanner are held relative to one another can negatively affect scanning functions. For example, if the pitch or skew between the scanner and the scanning surface of the object is too great, scanning may fail completely. In such situations, the illumination intensity across the images varies so much (due to the pitch or skew) that proper image analysis may fail or may be undesirably delayed. There are of course conventional methods for trying to avoid this problem. Some scanners measure their orientation, for example, by using an onboard accelerometer. These scanners, however, do not account for situations in which the scanner is held straight/upright but it is the scanning target that is held with skew/pitch. Other scanners attempt to compensate for uneven illumination by using image correction, such as high dynamic range (HDR). These scanners require multiple frames, which is not practical in many handheld scanner configurations.

The present disclosure describes various devices and methods that overcome these deficiencies of conventional systems. Various devices imaging-based data capture devices herein include one or more imaging processors (e.g., a scanning framework) comprising or communicating with a scanning device (e.g., including a scan engine) that includes an imaging assembly and an illumination assembly are used to capture an image that compensates for variations in illumination of a target object due to rotational variation (e.g., pitch, skew, etc.). The illumination assembly includes two or more LEDs that may surround the imaging assembly. The imaging assembly includes an imaging sensor which has two states; a first state in which all of the full area of the imaging sensor is captured/exposed and a second in which selected rows of pixels of the imaging sensor are captured/exposed to yield a lower resolution image (i.e., slit frame). The illumination assembly is configured to apply independent amounts of power or current to each LED surrounding the imaging assembly to compensate for the uneven illumination of the target object. The use of the second imaging state to quickly capture initial images on which the power compensation calculations are performed reduces the time needed to capture a suitable image for processing.

In various examples, devices have imaging assemblies that perform selective sampling of rows in the imaging sensor (i.e., in a slit frame) to quickly capture an image with the illumination assembly on and the illumination assembly off. The imaging assemblies may then segment both captured slit frames into different regions, and by comparing the regions between slit frames, the non-uniformly illuminated regions can be discovered. In various examples, these imaging assemblies may be configured to apply known mappings between their two or more LEDs and these regions, to modulate the power levels of each LED so that uniform illumination is achieved across a field of view. While the present techniques can be implemented on whole frames or slit frames, in various examples using initial slit frames, not full frames, the entire process of detecting and correcting for illumination variation can be performed in less than 1 frame time, yielding even better candidate images for normal scanning and decoding operations.

Turning to the Figures, FIG. 1 illustrates an exemplary imaging-based data capture device in the form of a barcode reader 100 having a housing 102 with a handle portion 104 and a head portion 106. The head portion 106 includes a window 108 and is configured to be positioned on the top of the handle portion 104. The window 108 has a long direction 112 and a short direction 114. The head portion 106 includes an imaging lens (e.g., imaging lens 244 as described with regard to FIG. 2 below) that, depending on the implementation, is and/or includes a variable focus optical element.

The handle portion 104 is configured to be gripped by a reader user (not shown) and includes a trigger 110 for activation by the user. Optionally included in an embodiment is a base portion (not shown), which may be attached to the handle portion 104 opposite the head portion 106 and is configured to stand on a surface and support the housing 102 in a generally upright position. The barcode reader 100 can be used in a hands-free mode as a stationary workstation when it is placed on a countertop or other workstation surface. The barcode reader 100 can also be used in a handheld mode when it is picked up off the countertop or base station and held in an operator's hand. In the hands-free mode, products can be slid, swiped past, or presented to the window 108 for the reader to initiate barcode reading operations. In the handheld mode, the barcode reader 100 can be moved towards a barcode on a product, and the trigger 110 can be manually depressed to initiate imaging of the barcode.

Other implementations may provide only handheld or only hands-free configurations. In the embodiment of FIG. 1, the reader 100 is ergonomically configured for a user's hand as a gun-shaped housing 102, though other configurations may be utilized as understood by those of ordinary skill in the art. As shown, the lower handle 104 extends below and rearwardly away from the body 102 along a centroidal axis obliquely angled relative to a central FOV axis of a FOV of an imaging assembly within the scanning head 102.

Referring next to FIG. 2, a block diagram of an example architecture for an imaging-based data capture device, such as the handheld imaging device 100 is shown. For at least some implementations, an imaging assembly 245 includes a light-detecting sensor or imager 241 operatively coupled to, or mounted on, a printed circuit board (PCB) 242 in the imaging device 200 as shown in FIG. 2. In an implementation, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 245 over a field of view along an imaging axis 246 through the window 208. The imager 241 may also include and/or function as a monochrome sensor and, in further implementations, a color sensor. It should be understood that the terms "imager", "image sensor", and "imaging sensor" are used interchangeably herein. Depending on the implementation, imager 241 may include a color sensor such as a vision camera in addition to and/or as an alternative to the monochrome sensor. In some implementations, the imager 241 is or includes a barcode reading module (e.g., a monochromatic imaging sensor). In further implementations, the imager 241 additionally or alternatively is or includes a vision camera (e.g., a color imaging sensor). It will be understood that, although imager 241 is depicted in FIG. 2 as a single block, that imager 241 may be multiple sensors spread out in different locations of imaging device 200.

During imaging, return light is scattered and/or reflected from an object 218 over the field of view. The imaging lens 244 is operative for focusing the return light onto the array of image sensors to enable the object 218 to be imaged. That imaging lens 244 may be a fixed lens assembly or a variable focusing optical assembly, for example. The light that impinges on the pixels is sensed and the output of those pixels produce image data that is associated with the environment that appears within the FOV (which can include the object 218). This image data is typically processed by a controller (usually by being sent to a decoder) which identifies and decodes decodable indicia captured in the image data. Once the decode is performed successfully, the reader can signal a successful "read" of the object 218 (e.g., a barcode). The object 218 may be located anywhere in a working range of distances between a close-in working distance (WD1) and a far-out working distance (WD2). In an implementation, WD1 is about one-half inch from the window 208, and WD2 is about thirty inches from the window 208.

An illuminating light assembly may also be mounted in, attached to, or associated with the imaging device 200. The illuminating light assembly includes illumination light sources 251, 255 such as at least two light emitting diodes (LED) and at least two illumination lenses 252, 256 and preferably a plurality of LEDs and illumination lenses, configured to generate an illumination pattern of illumination light on and along the object 218 to be imaged by image capture. Although FIG. 2 illustrates the illumination light sources 251, 255 as two LEDs in a linear configuration with the imager 241, it will be understood that the illumination light sources 251, 255 may include more light sources, as well as various configurations of the light source and the imager. Additionally, the illumination light sources 251, 255 are preferably equidistant from the imager 241, and in the case of more than two illumination light sources, the imager 241 is substantially in the center of the light sources. At least part of the scattered and/or reflected return light is derived from the illumination pattern of light on and along the object 218.

An aiming light assembly may also be mounted in, attached to, or associated with the imaging device 200 and preferably includes an aiming light source 223, e.g., one or more aiming LEDs or laser light sources, and an aiming lens 224 for generating and directing a visible aiming light beam away from the imaging device 200 onto the object 218 in the direction of the FOV of the imager 241.

Further, the imager 241, the illumination sources 251, 255 and the aiming source 223 are operatively connected to a programmed microprocessor or controller 258 operative for controlling the operation of these components. Depending on the implementation, the controller 258 is configured to control or includes a power source or current source for driving the illumination sources 251, 255. For example, the PCB 242 may include separately controllable current drivers, one for each illumination source, and the controller 258 may be configured to control each current driver using the methods and techniques described herein. In some examples, the controller 258 may also be included, in whole or in part, on the PCB 242.

In some implementations, the controller 258 is or includes an imaging processor, as described herein. The controller 258 operates the imager 241 in two distinct states: a first state which captures an image of the FOV utilizing the full height or area of the imager sensor/detector and a second state in which a preselected number of rows of pixels of the imager sensor/detector are exposed or detected, in some implementations. In further implementations, the controller 258 functions as or is communicatively coupled to an imaging processor for receiving, processing, and/or analyzing the image data captured by the imagers.

A memory 260 is connected and accessible to the controller 258. Preferably, the controller 258 is the same as the one used for processing the captured return light from the illuminated object 218 to obtain data related to the object 218. Though not shown, additional optical elements, such as collimators, lenses, apertures, compartment walls, etc. may be provided in the housing. Although FIG. 2 shows the imager 241, the illumination sources 251, 255, and the aiming source 223 as being mounted on the same PCB 242, it should be understood that different implementations of the imaging device 200 may have these components each on a separate PCB, or in different combinations on separate PCBs. For example, in an implementation of the imaging device 200, the illumination LED sources are provided as an off-axis illumination (i.e., has a central illumination axis that is not parallel to the central FOV axis). Further, the imaging device 200 may include a separate PCB which drives the illumination light sources as needed to perform the methods described herein to provide uniform illumination of a target object.

In some implementations, the object 218 is or includes an indicia for decoding (e.g., a decode indicia), such as a barcode, a QR code, a label, a UPC code, a digital matrix code, etc. In further implementations, the object 218 is or includes a digital watermark, the digital watermark may include a plurality of repeating barcodes, product codes, code patterns, or other such indicia that comprise the digital watermark. In some such implementations, the digital watermark is invisible or near-invisible to the human eye but is able to be detected and/or imaged by an imaging device 200. These indicia are decoded or interpreted using image-based data obtained as described herein.

Generally, the target object 218 may be presented to the handheld scanner 200 such that the surface of the object 218 is normal to an imaging axis 246, that is the surface of the object is parallel to the window 108. However, in many instances the upper surface a target object 218 is presented to an imaging device (e.g., a handheld scanner) 200 askew. The object 218 may have a degree of pitch, as well as a degree of skew. In FIG. 2, the target object 218 is shown in a first position A, where the surface of the target object is normal to the imaging surface of the imager 241, and is shown in a second position B, where the surface of the target object is skewed with respect to the imaging surface of the imager 241. In this disclosure, pitch is deviation of the object's surface from normal to the imaging axis 246 about an axis (shown in FIG. 2 as $A_L$) which is parallel to the long direction 112 of window 108. In other words, the pitch is the degree to which the surface of the object 218 deviates from being normal to the imaging axis 246 along an axis parallel to the short direction 114 of the window 208. Further, in this disclosure, skew is deviation of the surface of the target object 218 from a position normal to the imaging axis 246 about an axis which is parallel to the short direction 114 of the window 108. That is to say that the skew is the degree to which the object's surface, along an axis $A_L$ parallel to the long direction 112 of the window, deviates from being parallel to the window 108. As used in this disclosure, skew is equivalent to the aviation term yaw.

FIGS. 3A-3D illustrate various images captured of objects at different angles of pitch and skew with respect to handheld scanner, such as the handheld scanner 100 shown in FIG. 1. The images FIGS. 3A-3D are described with respect to a pitch angle and a skew angle. In each of FIGS. 3A-3D, a target object is seen, which in this case is a simple piece of paper. The target object in each of these figures is shown illuminated without compensation for the rotational variance. An aiming laser spot 325 in green is also shown. Points $A_1$ and $B_1$, as well as the line segment $AB_1$ joining these points, are also shown in each of FIGS. 3A-3D. That line segment $AB_1$ is parallel to the long axis $A_L$ of the window 108.

The illumination varies in its uniformity and the location of the aiming laser spot 325 is in different locations along $AB_1$ in each of the figures, FIGS. 3A-3D.

Figure 3:
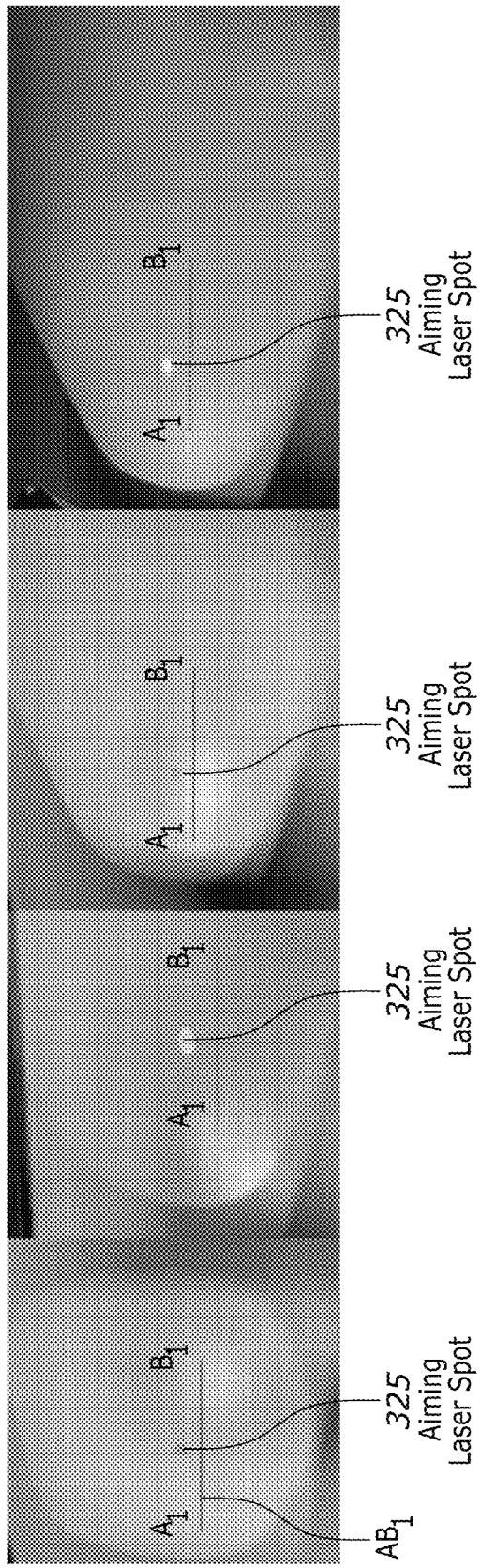
FIGS. 3A-3D illustrate various example images captured of an object in a field of view of the example scanner of FIG. 1 and at different pitch and skew relationships, thus resulting in different illumination intensities across the images, in accordance with various embodiments.

In FIG. 3A, because the surface of the object, the paper, is parallel to the window 108 of the handheld scanner 100, the pitch and skew are both 0 degrees. The illumination is substantially uniform across the scanner's FOV projected onto the paper. Additionally, the aiming laser spot 325 is located at the center of the line segment $AB_1$, indicating that there is no pitch or skew of the paper.

FIG. 3B shows the paper skewed by 30 degrees while having a pitch of 0 degrees. The skew causes the illumination of the paper's surface to be uneven. Additionally, the skew causes aiming laser spot 325 to be located closer to point $A_1$ along the line segment $AB_1$.

The target object, the paper, is skewed by 45 degrees and has a pitch of 0 degrees in FIG. 3C. The illumination is shown to be more uneven in FIG. 3C, and the aiming laser spot 325 is located even closer to the point $A_1$ along the line segment $AB_1$, as compared to FIG. 3B. The increase in illumination difference, or variation, across the FOV correlates to the amount of skew in FIG. 3C.

In FIG. 3D, the amount of skew between the paper and the handheld scanner is 60 degrees and the pitch is 0 degrees. The illumination is uneven to a greater degree than that see in FIG. 3B or FIG. 3C. The aiming laser spot 325 is markedly further toward the point $A_1$ along the line segment $AB_1$. There is a correlation between the amount of skew and both the uneven illumination and the degree to which the aiming laser spot 325 is towards the point $A_1$ seen in FIG. 3D.

To compensate for the lack of uniformity in the illumination, multiple images of the FOV are captured and compared. In this disclosure, the various images of the FOV are referred to as frames. At the start of a scanning event, the barcode reader 100 captures a first frame without any illumination, even that of the aiming light assembly. In other words, the first frame is captured with the illumination assembly in a deactivated state. Following the capture of the first frame, a second frame is captured using the default illumination of the barcode reader 100. The default illumination of the barcode reader 100 includes activation of the aiming light assembly, as well as the application of the same power to each of the illumination LEDs in the illumination assembly.

The first frame and the second frame are captured at the same resolution. In various examples, this resolution may be less than the resolution of the final frame captured during a scanning event, a third frame. That is, the controller (refer to 258 of FIG. 2) may cause the imager 241 to capture the first frame and second frame in a manner that is more rapid than the third frame. In some implementations, the manner in which the first and second frame are captured includes exposing and/or capturing a reduced number of pixels on a photodetector of the imager. In such implementations, the reduced number of pixels is achieved by skipping a predetermined number of rows of pixels on the imager. In some implementations, the controller of the handheld scanner controls the imaging array to capture every $16^{th}$ row of the image. This type of sampling or reduction of pixels captured is referred to as creating a slit frame in this disclosure. The slit frames captured which result in the first and second frames are of a greatly reduced size. In general, the reduction of the number of pixels captured on an imager may be achieved by binning, cropping an image, or by capturing slit frames. This reduction in the number of pixels captured (e.g., reduced file size) allows for operations/calculations done utilizing the first and second frames to be executed quickly while providing the amount of information needed to determine the adjusted current/power that should be applied to each of the illumination LEDs.

The calculation of the difference in brightness between the first and second frames is necessary to determine the amount of power to apply to each of the illumination LEDs to compensate for pitch and/or skew between an object and a handheld scanner. In some instances, the calculation of the brightness difference between the first and second frames (e.g., the two slit frames) is accomplished by creating regions or zones from the first and regions from the second frames, correlating regions from the first and second frames, and comparing the brightness difference between each of the correlated, corresponding regions.

Figure 4:
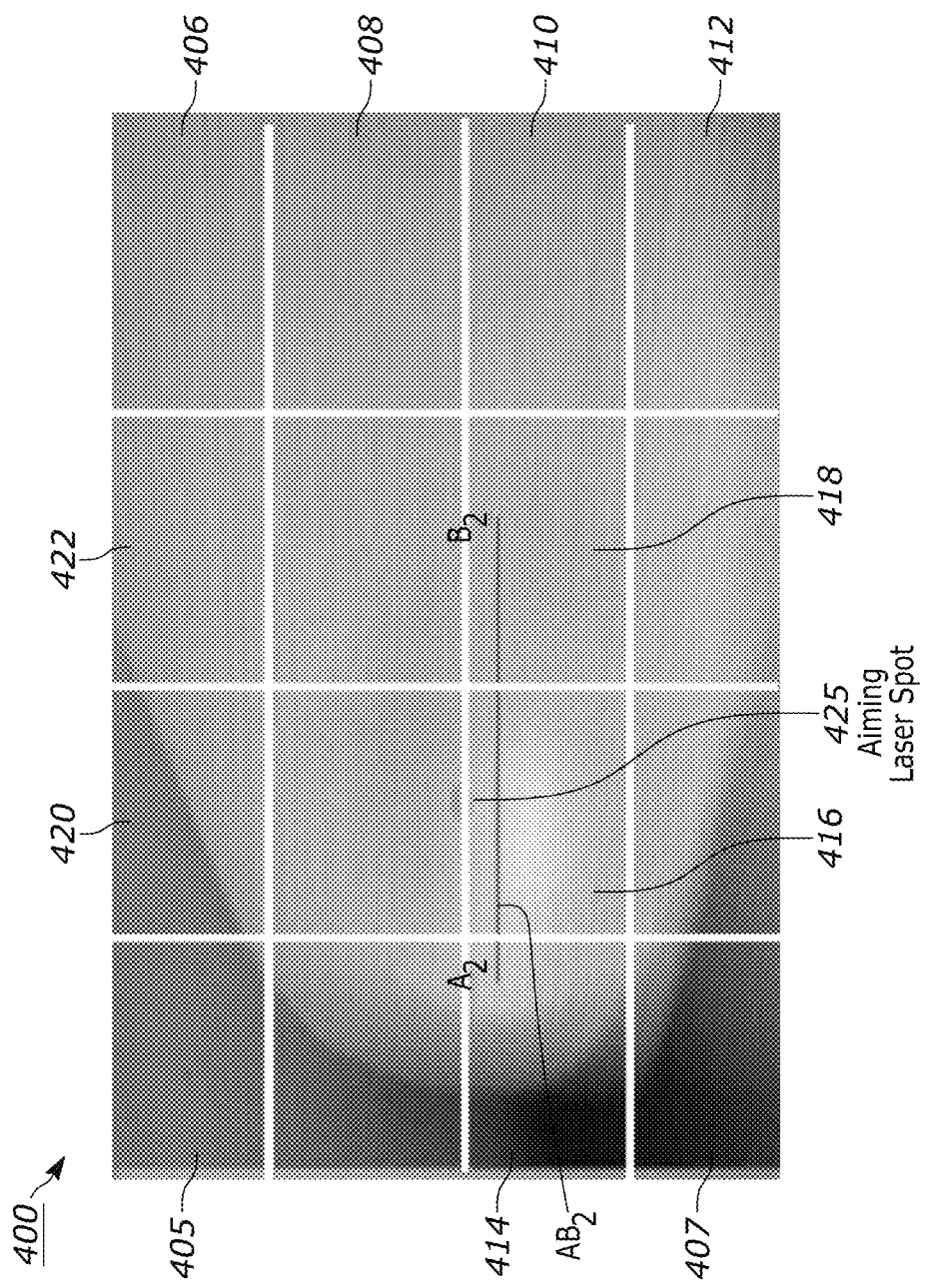
FIG. 4 shows an image taken by the example scanner of FIG. 1 that exhibits uneven illumination and showing 16 different regions over which the illumination is assessed, in accordance with various embodiments.

FIG. 4 shows an image 400 of a second slit frame that exhibits uneven illumination. The image 400 has been divided into 16 regions in a 4×4 grid. The image 400 previous to being divided into regions was that shown in FIG. 3C. This image 400 shows a skew of 45 degrees between the object and the handheld scanner. The target object is shown illuminated without compensation for this skew. An aiming laser spot 425 is shown in green. Points $A_2$ and $B_2$, as well as the line segment $AB_2$ joining these points are also shown in the FIG. 4. Point $A_2$ is shown as located with in region 414 while point $B_2$ is located in region 418. The line segment $AB_2$ extends from region 414, through region 416, and terminates in region 418. As mentioned with respect to FIG. 3C, the aiming laser spot 425 is located closer to point $A_2$ because of the amount of skew in the relative position between the object and the handheld scanner. In the image 400, there are regions that are predominantly dark and/or poorly illuminated, such as regions 405 and 407. In some implementations, these regions 405, 407 have corresponding regions on an image of the first frame (taken without any illumination). In some implementations, these regions 405, 407, which are not affected by the illumination assembly, are excluded from any calculations or determinations made based on difference in brightness between the first and the second frame.

In some examples, an image is divided into a 4×4 grid, as in image 400. Regions 406, 408, 410, 412, 420, 422 are less illuminated than other regions more central to the images, such as region 416. In some implementations, the various regions may be afforded a weight value, or a weighting factor, based on known characteristics of the illumination assembly and the imaging assembly. Alternatively, or additionally, in some implementations, the regions may be of different sizes, for example region 406 may have a greater area or encompass a greater number of pixels than region 405. The difference in sizes is based on known characteristics of the illumination and imaging assemblies in some implementations. Further, in some implementations, the different sizes of the regions are preassigned.

To obtain the brightness difference between the first and second frames, the frames are each portioned into corresponding regions, such as the regions of FIG. 4. For each frame, each region is assigned a brightness value. A difference between the brightness values of corresponding regions from the first and second frames is calculated. The calculated values resulting from the brightness difference between corresponding regions are used to determine what power to apply to each LED of the illumination assembly to compensate for any pitch or skew between the target object and the handheld scanner.

The brightness value for each region may be based on any of: range of brightness intensities, a peak intensity, a mode of the intensity values, and an average intensity. In some implementations, the brightness value for each region in each of the first and second frames is an average of the brightness over the region. Some implementations utilize the peak intensity of a region as the brightness value, and the peak intensity is defined as the pixel intensity above a threshold percentile level.

The third frame is captured with an adjusted power applied to each of the illumination LEDs. The adjusted power applied to each of the LEDs compensates for any skew/pitch between an object and a handheld scanner. In some implementations, a processor or controller of the handheld scanner calculates the amount of adjusted power to apply to each of the illumination LEDs. In some implementations, the processor which calculates the adjusted power to apply to each of the LEDs is part of a controller. Alternatively, in some implementations, the processor which calculates the adjusted power to apply to each LED is separate from the controller, but in communication with the controller. Further, in some implementations, the controller dictates the adjusted power to apply to each of the illumination LEDs to a separate component (e.g., a separate PCB) to compensate for pitch/skew between the target object and handheld scanner during the capture of the third frame.

Figure 5:
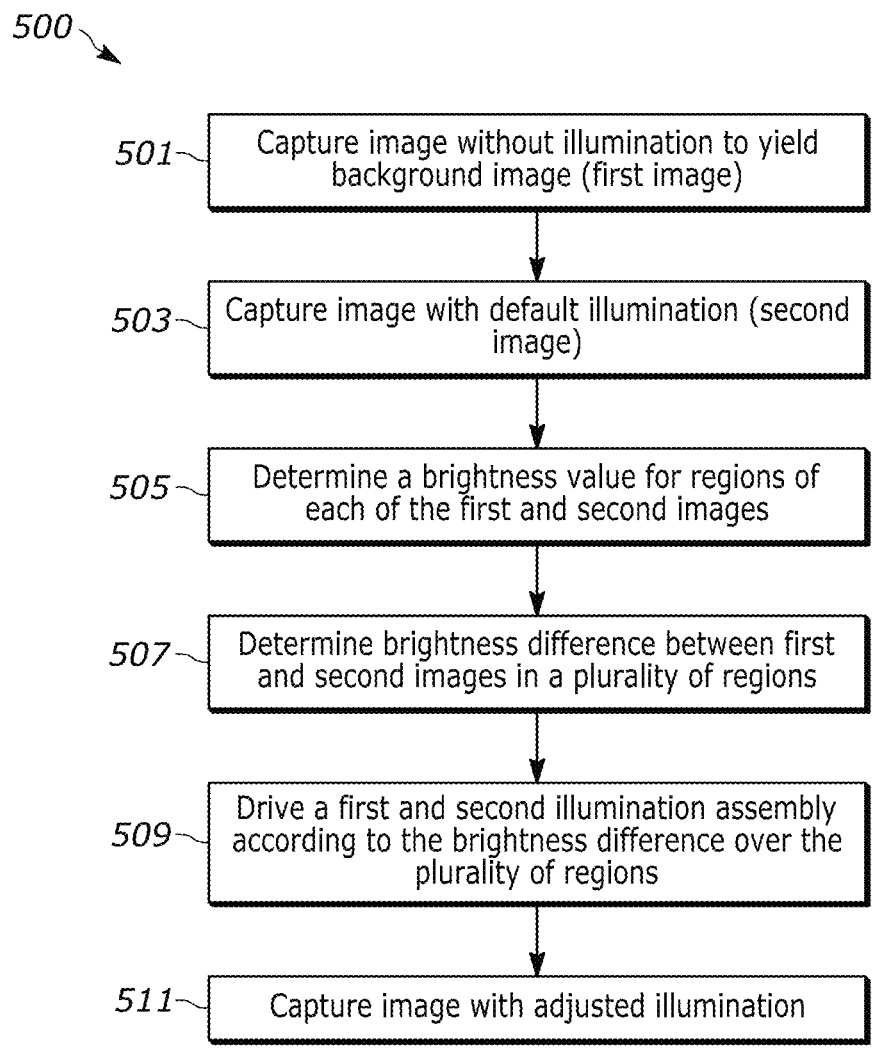
FIG. 5 illustrates a flow diagram of an example method for capturing images, detecting whether a target object is illuminated unevenly, and adjusting an imaging assembly to compensate for the uneven illumination, as may be performed by the example scanner of FIG. 1, in accordance with various embodiments.

Referring next to FIG. 5, illustrates a flow diagram of an example method 500 for capturing images, detecting whether a target object is illuminated unevenly, and adjusting an imaging assembly to compensate for the uneven illumination when capturing an image for processing according to the techniques described herein.

At block 501, an image is captured without illumination to yield a background image (i.e., a first image). This background image is referred to as the first frame hereinabove. A reduced resolution is used to acquire the background image. In some implementations, the reduced resolution is achieved by selectively sampling the pixels in the detector of the imaging assembly of the handheld scanner, for example by capturing a slit frame image.

At block 503, an image (i.e., a second image) is captured while the object is illuminated using default illumination. This second image is also referred to as the second frame in this disclosure. The reduced resolution used to acquire the first image, the first frame, is also used to acquire the second frame.

At block 505, brightness values are assigned to regions of the first image and of the second image. The brightness values may be determined as described above. In some implementations for each region, the brightness value is determined based on any of a range of brightness intensities, peak intensity, and/or average brightness within a region. The regions are areas of pixels in an image or frame that has been divided. In some implementations, each image is divided into a 4×4 grid, yielding 16 regions.

At block 507, a brightness difference between the first and second images is determined for a plurality of corresponding regions. At block 509, a first and a second illumination assembly, or a first and second LED of an illumination assembly, are driven or powered according to the brightness difference of the plurality of regions. Finally, at block 511, an image is acquired using the adjusted illumination. This image is referred to as the third frame, above. The final image acquired should exhibit uniform illumination across the object so that indicia or other characteristics of the object can be captured and used to identify the object.

In some implementations, the method can be iterative in terms of identifying optimal currents or power to use to drive the LEDs of the illumination assembly to achieve the most uniform illumination of an object. To optimize illumination uniformity, one or more thresholds are used to compare two or more regions, similar to those formed in a 4×4 matrix. In some implementations, preferably all of the regions in an image are tested to determine whether illumination uniformity has been achieved to a reasonable level. Two types of thresholds may be used individually or together to determine near equal illuminance across an object. The first threshold is one which compares the brightness of two regions of an image (e.g., frame captured after applying adjusted current/power to LEDs in the illumination array). When the brightness value of the two preselected regions meet a threshold similarity, then the entire image is declared to achieve near equal, or optimized, brightness across the image. The second type of threshold determines how many regions of an image, or frame, are dissimilar in their brightness level. When the number of regions with dissimilar brightness levels falls below an upper limit, then the entire image is considered to have achieved uniform illumination. In some implementations, the designation of the third frame as (tolerably) uniform in illumination is based on a determination of the mode of brightness values for each region of a grid resulting from taking the difference between corresponding regions the first and second frames. After determining the mode of the brightness values, the number of regions that deviate from the mode brightness value by more than a tolerance (e.g., by 5% of the mode) is determined, and that number of regions is compared to a threshold. The threshold value that sets a maximum for the number of regions which have a brightness value that is below the mode of the set of brightness values for all of the regions.

The methods described herein are executed by a processor connected to a controller of the imaging device. A memory is coupled to an imaging assembly, and illumination assembly, and a memory of the imaging, and the memory stores machine readable instructions that are executed by the processor. These instructions cause the imaging device to execute the methods described herein.

EXAMPLE

Figure 6A:
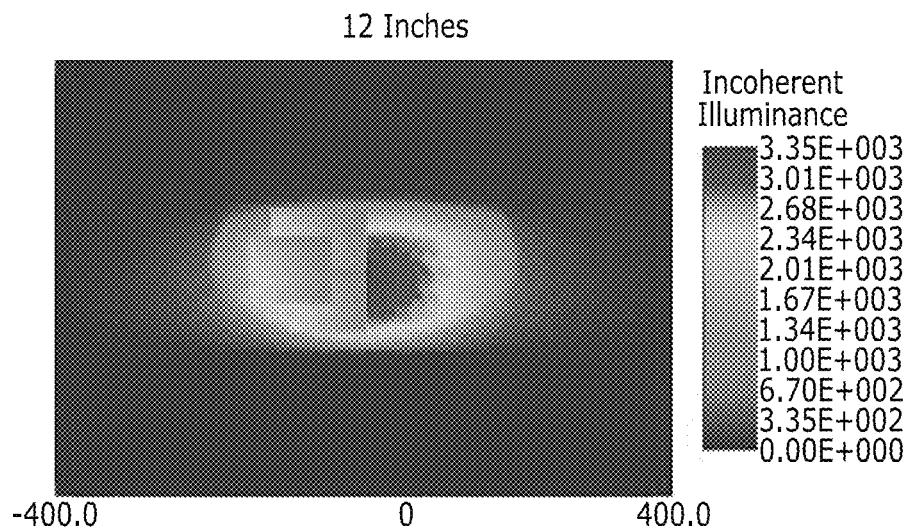
FIGS. 6A and 6B illustrate illumination data acquired using the techniques described herein, in accordance with various embodiments.
Figure 6B:
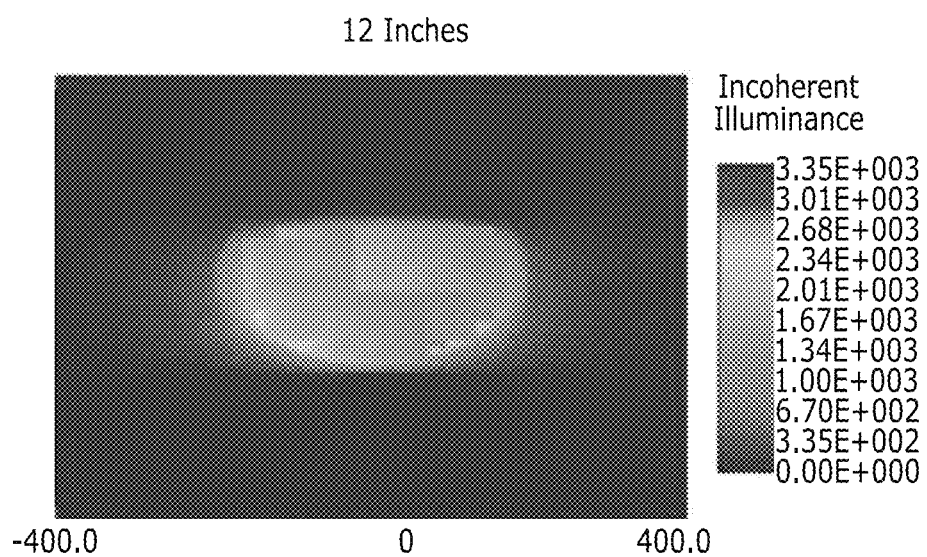

FIGS. 6A and 6B illustrate illumination data acquired using the techniques described herein. FIG. 6A is a light intensity (i.e., illuminance) map based on an image of an object captured using the default illumination of a handheld scanner. The degree of color variation seen in FIG. 6A indicates that the illumination of the object is irregular across the surface of the target object. FIG. 6B has the same target object as FIG. 6A. The handheld scanner used to capture the image on which the intensity map of FIG. 6B is based has applied the methods and technology described herein to compensate for any pitch/skew that would cause uneven illumination. The intensity map shown in FIG. 6B is almost uniform in color, indicating that the surface of the target object is substantially uniformly illuminated.

It will be understood that the foregoing represents one potential implementation, and that other implementations may be envisioned. Generally speaking, imaging-based data capture devices may be configured to include numerous, independent controllably illumination sources, that may be adjusted to compensate for detected illumination variations across captured image data. Other example imaging-based data capture devices include bioptic barcode scanners, machine vision cameras, etc.

Further, it will be understood that the term brightness may be interpreted as "illuminance", "intensity", or as "perceived light intensity on the surface of an object". Illuminance and/or the perceived light intensity on the surface of an object are detected by an imaging sensor of an imaging assembly, as described herein above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. An imaging-based data capture device comprising:
   an imaging assembly operable to capture image data over a field of view;
   an illumination assembly having a first illumination source and a second illumination source and operable to provide illumination light over at least a portion of the field of view;
   a processor communicatively coupled to the imaging assembly, the illumination assembly, and a memory; and
   the memory storing machine readable instruction that, when executed by the processor cause:
   the imaging assembly to capture a first frame with the illumination assembly providing illumination at a first level of intensity;
   the imaging assembly to capture a second frame with one of (i) the illumination assembly providing illumination at a second level of intensity that is lower than the first level of intensity or (ii) the illumination assembly in a deactivated state;
   determining, by the processor, a brightness difference between a plurality of respective regions of the first frame and the second frame; and
   capturing, by the image assembly, a third frame with the illumination assembly providing illumination at a third level of intensity that is different from the first level of intensity and the second level of intensity,
   wherein, the providing illumination, by the illumination assembly, at the third level of intensity includes driving a first illumination source of the illumination assembly with a first current and driving a second illumination source of the illumination assembly with a second current that is different from the first current, at least one of the first current or the second current being based on the brightness difference between the plurality of respective regions of the first frame and the second frame.

2. The imaging-based data capture device of claim 1, wherein the imaging assembly is situated between the first illumination source and the second illumination source.

3. The imaging-based data capture device of claim 1, wherein the first frame and the second frame are of lower resolution than that of the third frame.

4. The imaging-based data capture device of claim 1, wherein the first frame and the second frame each comprises selected rows of an image of the field of view.

5. The imaging-based data capture device of claim 1, wherein the brightness difference between a plurality of respective regions of the first frame and the second frame is based on one or more of:
   (i) a range of brightness intensities,
   (ii) a peak intensity, and
   (iii) an average intensity.

6. The imaging-based data capture device of claim 1, wherein the regions have differing sizes.

7. The imaging-based data capture device of claim 1, wherein one or more of the respective regions has a weighting factor.

8. The imaging-based data capture device of claim 1, wherein the memory further comprises instructions that when executed by processor cause:
   determining a degree of similarity between a predetermined number of the regions; and
   comparing the degree of similarity to a threshold degree of similarity to determine whether the second frame includes an illumination of the first frame that is above the predetermined threshold.

9. The imaging-based data capture device of claim 1, wherein the memory further comprises instructions that when executed by processor cause:
   determining a peak intensity value for a predetermined number of regions;
   determining a number of regions that deviate from a mode of a set of peak intensity values from the predetermined number of regions;
   comparing the number of regions that deviate from the mode of the set of peak intensity values to a maximum allowable number of regions; and
   designating the third frame to be tolerably uniform in illumination over the at least a portion of the field of view when the number of regions that deviate from the mode of the set of peak intensity values is less than or equal to the maximum allowable number of regions.

10. A method for capturing image-based data using a handheld device, the method comprising:
    capturing, by an imaging assembly, a first frame with an illumination assembly providing illumination at a first level of intensity;
    capturing, by the imaging assembly, a second frame with one of (i) the illumination assembly providing illumination at a second level of intensity that is lower than the first level of intensity or (ii) the illumination assembly in a deactivated state;
    determining a brightness difference between a plurality of respective regions of the first frame and the second frame; and capturing, by the image assembly, a third frame with the illumination assembly providing illumination at a third level of intensity that is different from the first level of intensity and the second level of intensity, wherein the providing illumination at the third level of intensity includes driving a first illumination source of the illumination assembly with a first current and driving a second illumination source of the illumination assembly with a second current that is different from the first current, at least one of the first current or the second current being based on the brightness difference between the plurality of respective regions of the first frame and the second frame.

11. The method of claim 10, wherein the handheld device comprises:
the imaging assembly that is operable to capture image data over a field of view; and
the illumination assembly that has at least two illumination sources, the illumination assembly operable to provide illumination light over at least a portion of the field of view.

12. The method of claim 11, wherein the imaging assembly is situated between the first illumination source and the second illumination source.

13. The method of claim 11, wherein the regions have differing sizes.

14. The method of claim 13, wherein the differing sizes are preassigned to the regions based on known characteristics of the imaging assembly and characteristics of the illumination assembly.

15. The method of claim 10, wherein the first frame and the second frame are of lower resolution than that of the third frame.

16. The method of claim 10, wherein the first frame and the second frame each comprises selected rows of an image of a field of view.

17. The method of claim 10, wherein the brightness difference between a plurality of respective regions of the first frame and the second frame is based on one or more of:
(i) a range of brightness intensities,
(ii) a peak intensity, and
(iii) an average intensity.

18. The method of claim 10, further comprising:
determining a peak intensity value for a predetermined number of regions;
determining a number of regions that deviate from a mode of a set of peak intensity values from the predetermined number of regions;
comparing the number of regions that deviate from the mode of the set of peak intensity values to a maximum allowable number of regions; and
designating the third frame to be tolerably uniform in illumination over the at least a portion of a field of view when the number of regions that deviate from the mode of the set of peak intensity values is less than or equal to the maximum allowable number of regions.

19. The method of claim 10, further comprising:
determining a degree of similarity between a predetermined number of the regions; and
comparing the degree of similarity to a threshold degree of similarity to determine whether the second frame includes and illumination of the first frame that is above the predetermined threshold.

20. The method of claim 10, wherein one or more of the regions has a weighting factor.

* * * * *